(12) United States Patent
Van Berkel et al.

(10) Patent No.: US 7,383,419 B2
(45) Date of Patent: Jun. 3, 2008

(54) ADDRESS GENERATION UNIT FOR A PROCESSOR

(75) Inventors: Cornelis Hermanus Van Berkel, Eindhoven (NL); Patrick Peter Elizabeth Meuwissen, Eindhoven (NL)

(73) Assignee: NXP B.V., Eindhoven (NL)

( * ) Notice: Subject to any disclaimer, the term of this patent is extended or adjusted under 35 U.S.C. 154(b) by 344 days.

(21) Appl. No.: 10/515,462

(22) PCT Filed: May 7, 2003

(86) PCT No.: PCT/IB03/01892

§ 371 (c)(1),
(2), (4) Date: Nov. 22, 2004

(87) PCT Pub. No.: WO03/100600

PCT Pub. Date: Dec. 4, 2003

(65) Prior Publication Data

US 2006/0010255 A1    Jan. 12, 2006

(30) Foreign Application Priority Data

May 24, 2002  (EP) .................. 02077034
Sep. 4, 2002  (EP) .................. 02078619

(51) Int. Cl.
*G06F 9/32*  (2006.01)

(52) U.S. Cl. .................. 711/220; 711/119

(58) Field of Classification Search .................. None
See application file for complete search history.

(56) References Cited

U.S. PATENT DOCUMENTS 6,260,137 B1 *  7/2001  Fleck et al. .................. 712/225
6,349,380 B1 *  2/2002  Shahidzadeh et al. ...... 712/211
6,363,470 B1 *  3/2002  Laurenti et al. ............ 711/220

FOREIGN PATENT DOCUMENTS

WO    WO 9914663       3/1999
WO    WO 0104765 A1    1/2001

* cited by examiner

*Primary Examiner*—Than Nguyen
(74) *Attorney, Agent, or Firm*—Peter Zawilski

(57) ABSTRACT

A processor includes a memory port for accessing a physical memory under control of an address. A processing unit executing instructions stored in the memory and/or operates on data stored in the memory. An address generation unit ("AGU") generates address for controlling access to the memory; the AGU being associated with a plurality of N registers enabling the AGU to generate the address under control of an address generation mechanism. A memory unit is operative to save/load k of the N registers, where $2<=k<=N$, triggered by one operation. To this end, the memory unit includes a concatenator for concatenating the k registers to one memory word to be written to the memory through the memory port and a splitter for separating a word read from the memory through the memory port into the k registers.

10 Claims, 4 Drawing Sheets

ADDRESS GENERATION UNIT FOR A PROCESSOR

FIELD OF THE INVENTION

The invention relates to an address generation unit for a processor.

BACKGROUND OF THE INVENTION

In signal processing a high percentage of the algorithms use loops, usually with high iteration counts and consisting of relatively few instructions and/or operating on relatively few data, such as a line of pixel blocks. To improve the speed of processing, DSPs have been equipped with so-called address generation units (AGUs). These units generate from a current address the next address. Some units support several addressing modes. The units calculate the addresses using a number of registers, depending on the addressing mode. Address generation units are known for generating data addresses (sometimes also referred to as address computation units (ACUs)) as well as for generating instruction addresses (sometimes also referred to as loop control units).

WO 01/04765 describes a VLIW processor for signal processing. The processor includes four the same processing elements, each with a number of functional units. Each of the processing elements includes as a functional unit an address generation unit (AGU). The AGU supports seven addressing modes, being direct addressing, base plus offset addressing, indirect/indexed addressing, base plus index addressing, circular indexed addressing and processing element relative addressing. For each of the addressing modes registers are used to calculate the addresses. For details on the addressing modes, the algorithms for calculating the next address, the registers used by the algorithm and exemplary hardware implementations, the reader is referred to WO 01/04765. The VLIW instruction includes an instruction slot for each of the processing elements. The addressing mode is indicated as part of the instruction. The registers are part of the processor's context and can be loaded, saved, and restored as other registers that are part of the context. The VLIW processor is used in combination with a wide memory for storing the VLIWs. Each memory line stores one VLIW instruction. The memory is accessed for each instruction fetched and fed directly to the decode logic to control the execution of multiple execution units in parallel.

The processing elements of the known VLIW processor are single instruction multiple data stream (SIMD) processors, also known as vector processors. A VLIW vector processor potentially has a very high performance for signal processing. Signal processing tasks that would require such a performance, like a software modem for 3G mobile communication standards, are usually composed of many sub-tasks that can be vectorized. The vector processing does result in such sub-tasks being completed relatively fast. Completed in this context also covers the situation wherein al block of data has been processed and processing will be resumed at a later moment for a new data block (usually in fixed cycles). Consequently, switching between sub-tasks also occurs relatively frequently. A context switch requires that the current registers of one or more ACUs that are used for the currently halted task are saved and the saved registers for the newly activated or re-activated task are loaded into the relevant registers of the involved ACUs. For each ACU, for example, four registers may be involved. For one ACU the context switch may thus include saving/restoring a total of 8 registers.

SUMMARY OF THE INVENTION

It is an object of the invention to provide a processor architecture that is better suitable for high-performance tasks, in particular signal processing for mobile communication systems. It is a further object to provide such architecture for vector processors.

To meet the object, the processor includes: a memory port for accessing a physical memory under control of an address; at least one processing unit for executing instructions stored in the memory and/or operating on data stored in the memory; an address generation unit (hereinafter "AGU") for generating an address for controlling access to the memory, the AGU being associated with a plurality of N registers enabling the AGU to generate the address under control of an address generation mechanism; and a memory unit operative to save/load k of the N registers, where $2<=k<=N$, triggered by one operation, where the memory unit includes a concatenator for concatenating the k registers to one memory word to be written to the memory through the memory port and a splitter for separating a word read from the memory through the memory port into the k registers.

The inventors have realized that as the performance of the processors increases the time spent on configuration of the registers of the AGUs increasingly becomes bottle-neck. In the conventional processor architectures only one register can be saved or restored in a memory cycle, resulting in much time being wasted waiting for the AGUs to be initialized (configured) with the correct data To overcome this, at least two of the registers can be saved triggered by one operation, such as a context switch or explicit instruction to save or restore some or all of the AGU registers. To this end, the memory unit of the processor includes a concatenator and splitter for mapping a plurality of the AGU registers to one memory word. The AGU and memory unit according to the invention can in principle be used in any processor, such as a DSP. Advantageously, the AGU and memory unit are used in a vector processor. So far, vector processors have not been used widely for signal processing. This is partly caused by the fact that the conventional vector processor architecture is ineffective for applications that are not 100% vectorizable, due to the implications of what is known as "Amdahl's Law". This law states that the overall speedup obtained from vectorization on a vector processor with P processing elements, as a function of the fraction of code that can be vectorized (f), equals $(1-f+f/P)^{-1}$. This means that when 50% of the code can be vectorized, an overall speedup of less than 2 is realized (instead of the theoretical maximum speedup of 32). This is because the remaining 50% of the code cannot be vectorized, and thus no speedup is achieved for this part of the code. Even if 90% of the code can be vectorized, the speedup is still less than a factor of 8. For use in consumer electronics applications, in particular mobile communication, the additional costs of a vector processor can only be justified if a significant speed-up can be achieved. The AGU and memory unit according to the invention assist in breaking through Amdahl's law by providing optimal support for processing of the data and/or instruction loops and efficiently handling jumps and context switches.

As described in the dependent claim 2, the memory unit is operative to perform the saving/loading in one read/write cycle of the physical memory. In this way, the AGU configuration can take place fast. Preferably, all AGU registers are saved/loaded in one operation as described in the dependent claim 3.

As described in the dependent claim 4, the processor has several sets of registers, where each set enables an AGU to generate an address. With the increased performance, the processor can perform more tasks in parallel and thus can benefit from using more than one set of registers. For efficient processing of data or instruction loops a set of registers per loop may be used. To speed up configuration of the plurality of sets, registers of more than one set can be saved in one operation by concatenating the registers of several sets to one memory word. As described in the dependent claim 5, the processor may have several AGUs, each with an own set of registers. The different AGUs may be functionally the same (and thus have the same number of registers). If so desired, different AGUs may be assigned to different address calculation schemes and, consequently, may have different numbers of registers. Preferably, all registers of at least two AGUs can be saved/loaded in one operation using one memory word. Alternatively, as described in the dependent claim 6, an AGU may also be associated with more than one set of registers, where each set enables the generation of an address. In this case, the AGU can be selectively connected to a set to perform a new address calculation. Preferably, all registers of at least two sets of registers can be saved in one memory word.

As described in the dependent claim 8, advantageously the sets of registers that need to be configured can be selected. In this way, AGUs and/or sets of registers can optimally be allocated to tasks where, in response to a context switch involving the task, the involved AGUs and/or sets of registers can be easily selected and reconfiguration be achieved. To simplify the selection, AGUs and/or the sets of registers may be grouped in separately selectable groups. The groups can then be assigned freely to tasks. Reconfiguration stakes place for at least one group at a time.

As defined in the dependent claim 9, the width of the memory word is a multiple of the smallest word on which the processor can operate. The registers are stored in the memory on processor word boundaries. In this way the register values can be changed easily without requiring additional instructions to set the AGU registers As described in the dependent claim 8, preferably the processor can operate on a plurality of M data elements in parallel (for example, the processor is an SIMD/vector processor) and the memory is wide to be able to store all M data elements in one memory word. In this way, many registers of AGUs can be saved/loaded in one operation.

These and other aspects of the invention are apparent from and will be elucidated with reference to the embodiments described hereinafter.

DETAILED DESCRIPTION OF THE PREFERRED EMBODIMENT

Figure 1:
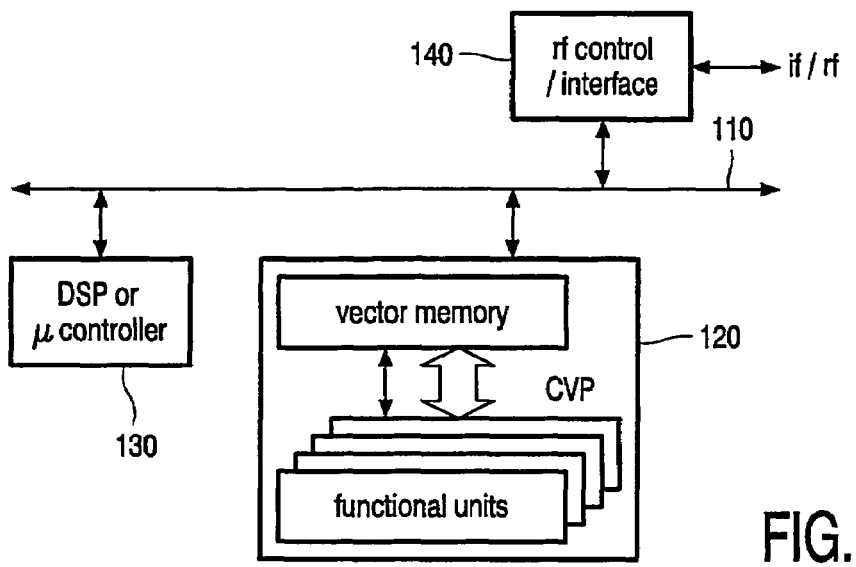
FIG. 1 shows a preferred configuration in which the scalar/vector processor according to the invention may be used.

The address generation unit (AGU) and memory unit are preferably used in a processor optimized for signal processing. Such a processor may be a DSP or any other suitable processor/micro-controller. The remainder of the description describes using the units in a highly powerful scalar/vector processor. Such a processor may be used stand-alone or in combination with another processor. FIG. 1 shows a preferred configuration in which the scalar/vector processor may be used. In this configuration, three main components are connected via a bus 110. The bus 110 connecting these three components may be any suitable bus, for example an AMBA High-speed Bus (AHB). The main components are:

the programmable scalar/vector processor 120 comprising functional units and a local data memory (referred to as vector memory in FIG. 1), a micro-controller or DSP subsystem 130, including limited on-chip program and data memory;

an interface block 140.

The scalar/vector processor 120 is mainly used for regular, "heavy/duty" processing, in particular the processing of inner-loops. The scalar/vector processor includes vector processing functionality. As such, it provides large-scale parallelism for the vectorizable part of the code to be executed. The vast majority of all signal processing will be executed by the vector section of the scalar/vector processor. With an array of, for example, 32 identical processing elements executing the same instruction, it offers massive parallelism. Combined with a 32-word wide memory interface this leads to unprecedented programmable performance levels at low cost and moderate power-consumption. However, fully exploiting this parallelism is not always feasible, as many algorithms do not exhibit sufficient data parallelism of the right form. According to Amdahl's law, after vectorization of the directly vectorizable part of the code, most time is spent on the remaining code. The remaining code can be split into four categories:

address related instructions (e.g. incrementing a pointer into a circular buffer, using modulo addressing)

regular-scalar operations (i.e. scalar operation that correspond to the main loop of the vector processor)

looping irregular scalar operations

The fractions of code for each of these categories is highly dependent on the algorithm executed. For example, the Golay correlator (used for P-SCH searching) requires a lot of address related instructions, but this is not the case for other algorithms such as the Rake. The performance of address related instructions and looping can be optimized by using the AGU/memory unit according to the invention. The operation of the regular scalar operation scan be optimized by tightly integrating scalar and vector processing in one processor. Study of all the algorithms relevant for 3G modems by the inventors has revealed that the fraction of irregular scalar operations is very limited. This property allows the separation of tasks between the scalar/vector processor 120 and the micro-controller or DSP 130 where the separate micro-controller or DSP 130 performs the irregular tasks and, preferably, controls the scalar/vector processor as well. In this preferred configuration, the scalar/vector processor 120 acts as a programmable, co-processor (in the remainder also referred to as CVP, Co-Vector Processor). The interface between the scalar/vector processor 120 and the micro-controller 130 deals with communication (e.g. through shared memory) and synchronization (e.g. through shared memory and status signals). The interface is preferably memory-mapped.

The interface block 140 allows the processors to interact with the remainder of the system. In the preferred embodiment, the scalar/vector processor is used as a software modem (transceiver) for 2G/3G mobile networks. For such a software modem function, the interface block 140 may include dedicated hardware as a front-end with as a main task to pass control and data words to the vector memory, for example DMA, under control of the micro-controller 130. The data in the vector memory is then processed by the scalar/vector processor.

The scalar/vector processor 120 may be a slave to the bus 110, whereas the micro-controller 130 and the interface block 140 (which may include a DMA unit) may act as a master. All the communication with the CVP, be it program, data, or control, is preferably memory mapped. The memory may be an off-chip DRAM, and this DRAM may also be used as (de-) interleaving memory by the scalar/vector processor.

In the description the phrase "address calculation unit" or ACU is mainly used. For the purpose of the description this is considered to be the same as "address generation unit" or AGU. The description focuses on using such units for calculating data addresses. Persons skilled in the art will be able to use the same functionality also for calculating instruction addresses ("loop control").

Figure 2:
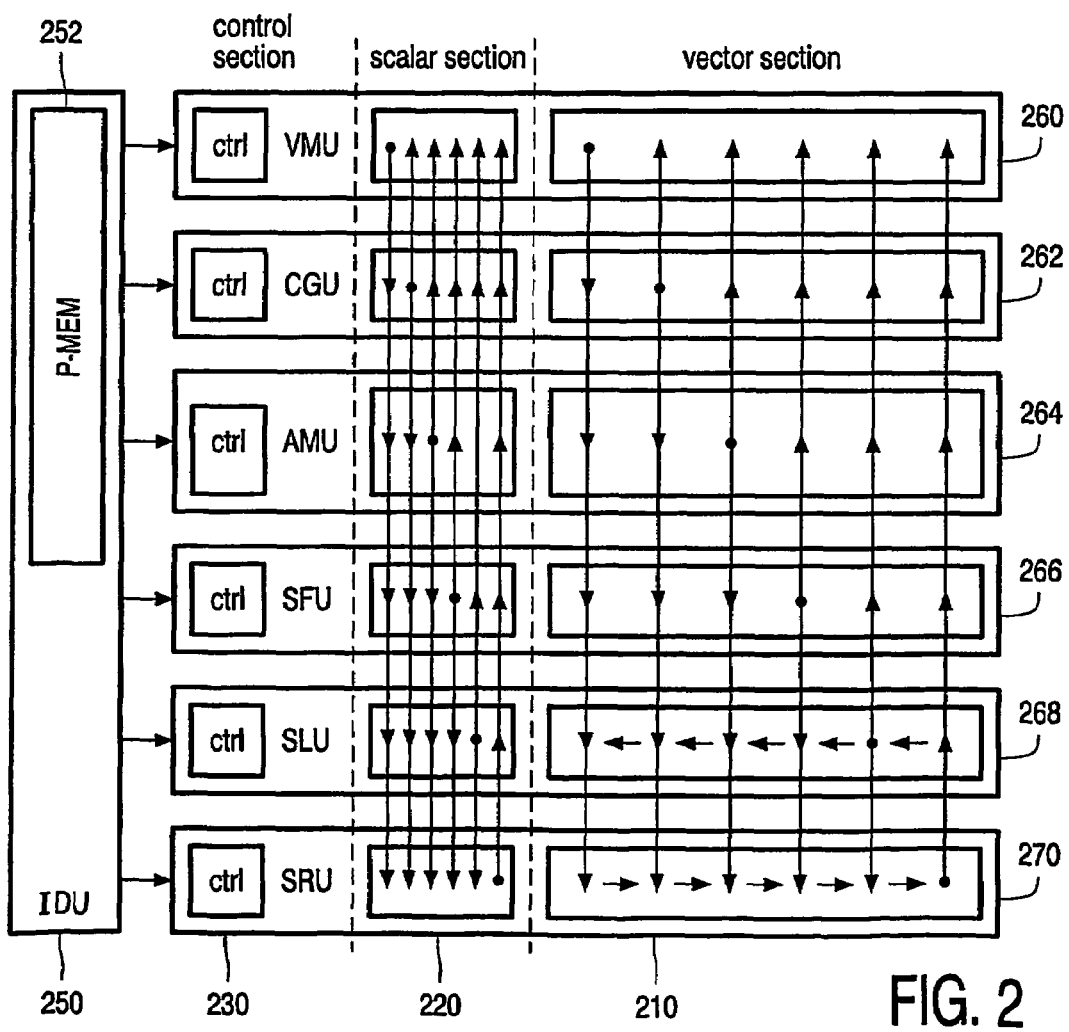
FIG. 2 shows the main structure of the scalar/vector processor according to the invention.

FIG. 2 shows the main structure of the processor according to the invention. The processor includes a pipelined vector processing section 210. To support the operation of the vector section, the scalar/vector processor includes a scalar processing section 220 arranged to operate in parallel to the vector section. Preferably, the scalar processing section is also pipelined. To support the operation of the vector section, at least one functional unit of the vector section also provides the functionality of the corresponding part of the scalar section. For example, the vector section of a shift functional unit may functionally shift a vector, where a scalar component is supplied by (or delivered to) the scalar section of the shift functional unit. As such, the shift functional unit covers both the vector and the scalar section. Therefore, at least some functional units not only have a vector section but also a scalar section, where the vector section and scalar section can co-operate by exchanging scalar data. The vector section of a functional unit provides the raw processing power, where the corresponding scalar section (i.e. the scalar section of the same functional unit) supports the operation of the vector section by supplying and/or consuming scalar data. The vector data for the vector sections are supplied via a vector pipeline.

In the preferred embodiment of FIG. 2, the scalar/vector processor includes the following seven specialized functional units.

Instruction Distribution Unit (IDU 250). The IDU contains the program memory 252, reads successive VLIW instructions and distributes the 7 segments of each instruction to the 7 functional units. Preferably, it contains a loop unit that supports up to three nested levels of zero-overhead looping. In the preferred embodiment, it does not support branches, jumps, or interrupts. The initial program counter is loaded from the stint descriptor, described in more detail below.

Vector Memory Unit (VMU 260). The VMU contains the vector memory (not shown in FIG. 2). During each instruction it can send a line or a vector from the vector memory or receive a line into the vector memory. The same instruction may specify in addition a scalar send operation and/or a receive operation. The VMU is the only functional unit connected to the external world, i.e. to the external bus 110.

The Code-Generation Unit (CGU 262). The CGU is specialized in finite-field arithmetic. For example, the CGU can be used for generating vectors of CDMA code chips as well as related functions, such as channel coding and CRC.

ALU-MAC Unit (AMU 264). The AMU is specialized in regular integer and fixed-point arithmetic. It supports inter-vector operations, where arithmetic is performed element-wise on multiple vectors. In a preferred embodiment, the AMU also provides some intra-vector operations, where arithmetic is performed on the elements within a single vector.

Shuffle Unit (SFU 266). The SFU can rearrange elements of a vector according to a specified shuffle pattern.

Shift-Left Unit (SLU 268). The SLU can shift the elements of the vector by a unit, such as a word, a double word or a quad word to the left. The produced scalar is offered to its scalar section. Depending on the type of SLU vector-operation issued, the consumed scalar is either zero, or taken from its scalar section.

Shift-Right Unit (SRU 270). The SRU is similar to the SLU, but shifts to the right. In addition it has the capability to merge consecutive results from intra-vector operations on the AMU.

The following table shows that all FUs have a functional vector section 210, where some do not have a control section 230 or scalar section 220.

| Functional Unit | control | scalar | vector |
| --- | --- | --- | --- |
| Instruction-Distribution Unit | sequencing, looping | | instruction distribution |
| Vector Memory Unit | address computation | scalar i/o | vector i/o |
| Code-Generation Unit | | | code vector generation |
| ALU-MAC Unit | indexing | broadcast | inter vector: ALU, MAC, mul, . . . |
| | | segmentation | intra vector: add, max |
| Shuffle Unit | | | vector shuffle |
| Shift-Left Unit | | scalar i/o | vector shift |
| Shift-Right Unit | | scalar i/o | vector shift |

The scalar/vector processor according to the invention applies instruction-level parallelism in two major ways:

vector processing, where a single instruction operates on vectors of (scalar) data. This approach is also known as single-instruction stream, multiple-data stream or SIMD parallel processing of multiple functional units, each operating on vectors. This can be seen as a (restricted) form of VLIW instruction-level parallelism.

Note that these two forms of instruction-level parallelism are independent, and that their effects are cumulative.

Inter-FU Communication

The functional units (FLY) operate in parallel. Each FU is capable of receiving and sending vector data. Many FUs are also capable of receiving and sending scalar data.

| FU target | source #inputs | vmu | cgu | amu | sfu | slu | sru |
|---|---|---|---|---|---|---|---|
| vmu | 1 | | ! | ! | ! | ! | ! |
| cgu | 1 | ! | | ! | ! | ! | ! |
| amu | 2 | ! | ! | | ! | ! | ! |
| sfu | 1 | ! | ! | ! | | ! | ! |
| slu | 1 | ! | | ! | ! | | ! |
| sru | 1 | ! | | ! | ! | ! | |

All functional units operate in parallel. Upon reception of their segment of an instruction, they input, process, and output data, both vector data and, where applicable, scalar data. Among FUs the communication is strictly among the scalar sections or among vector sections (inter-FU communication). That is, the vector sections of all FUs except the IDU are connected by a pipeline. In a preferred embodiment, this pipeline is configurable on instruction basis. To this end, preferably the FUs are interconnected by an interconnect network, in principle allowing each vector section to receive a vector from any the of other vector sections during each cycle. This feature enables, amongst others, the creation of arbitrary pipelines of the FUs (except the IDU). The six of the functional units that contribute to the vector path can output a vector and send it to other units in parallel during each clock cycle. They can also receive a vector from another unit. The network is nearly fully connected. Only links that are not meaningful have been omitted. The AMU can receive two vectors simultaneously. As shown in FIG. 2, the network is preferably formed by each FU being connected as a signal source (indicated by a disc) to one network path. It is connected to all other paths as a signal sink (indicated by a triangle). The section of the VLIW instruction for the FU indicates from which path it should consume a vector. In this way the pipeline can be configured on an instruction basis. Each path can transfer a full vector, e.g. using 256 parallel wires. Similarly, at least some of the scalar sections of the FUs are connected by a separate pipeline. Preferably, this pipeline is also configurable on instruction basis. The interconnect network among the scalar sections of the FUs can be partial in the sense that no scalar can be sent to or received from a scalar section of at least one FU. Hence, fewer pipeline orderings can be specified. The scalar and vector pipelines can be configured independently. For example, by indicating in the relevant VLIW section both the scalar pipeline and the vector pipeline to be read by the functional unit.

There is no connectivity specified among the control sections of the different functional units. These control sections receive a segment of the VLIW instruction from the IDU, update their own state, and control their respective scalar and vector sections.

Intra-FU Communication

Within an FU there is tight interaction between these sections (intra-FU communication). The interaction is an integral part of the operation of the FU. Examples are the SLU and SRU, where the produced and/or consumed scalar is provided to/taken from the corresponding scalar section part of the FU.

Instructions are typically executed in a single cycle. Exceptions are caused by congestion at the vector memory and manifest themselves as stall cycles.

Data Widths

Figure 3:
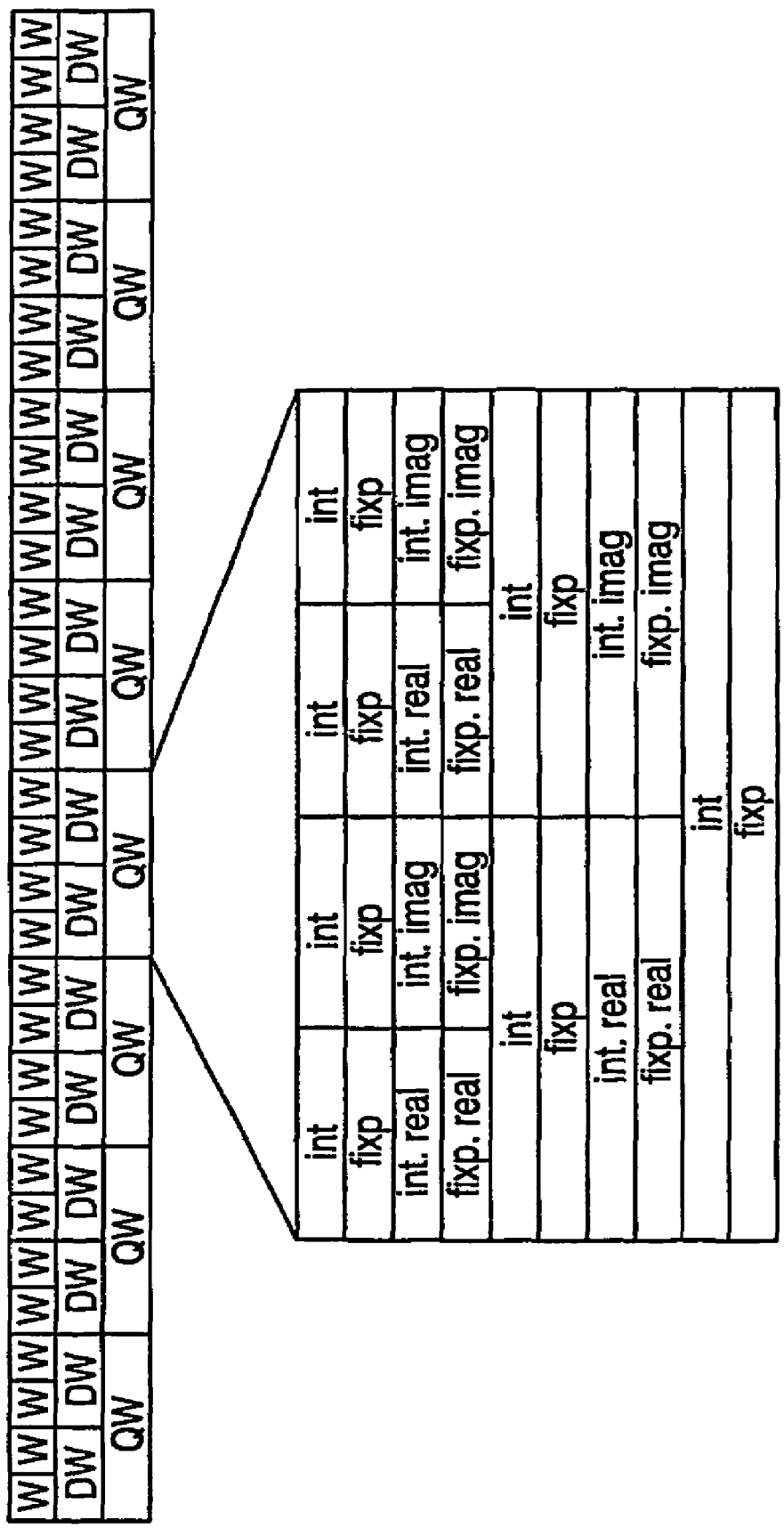
FIG. 3 shows supported data widths and data types.

In a preferred embodiment, the scalar/vector processor supports a plurality of data widths and data types as shown in FIG. 3. The basic unit of memory addressing is a word, also referred to as a single word. Preferably, data width can be a single word (W), double word (DW, or 2W=16 bits)), or quad word (QW or 4W=32 bits). The size of a word is W=8 bits. Preferably, scalars come in three sizes: (single) words, double words, and quad words. A vector has a fixed size of $P_Q$ quad words. It can preferably be structured in one of the three following formats:

$P_Q$ elements of size quad word, $P_D=2P_Q$ elements of size double word, $P_S=2P_D=4P_Q$ elements of size (single) word.

The vector-element indexing range is $[0 \ldots 4P_Q-1]$. Hence double words have even indices and the indices of quad words are multiples of four. FIG. 3 gives an overview of the data sizes. The architecture is fully scalable in $P_Q$ and is defined for any vector size $P_Q \geq 1$. However, for most situations it is preferred to choose a power of 2 for $P_Q$. In the preferred embodiment, $P_Q$ is 8, implying a data path width and memory width of 32 words.

Instructions

A CVP instruction is either a control instruction or a VLIW instruction. Control instructions may, for example, be zero-overhead loop initialization. There are no branches, jumps, or subroutines. A VLIW instruction is partitioned into segments, where each instruction segment specifies the operation(s) to be performed by the corresponding functional unit. The segment can be further subdivided in a part for the vector section, and the scalar section (if present). The segment also includes for both parts information on which network part to use for receiving data (one or more vectors for the vector section and one or more scalars for the scalar section).

State of the Scalar/Vector Processor

The state of the CVP is the combined states of its functional units. In the preferred embodiment, it comprises:

the vector memory (part of the VMU);

the program memory (part of the IDU);

vector registers (all functional units);

scalar registers (most functional units);

control registers, including the program counter, and address-offset registers.

In addition to the programmer-visible registers, a CVP realization typically contains additional registers (vector, scalar, and control) for pipelining and caching. These are not part of the CVP instruction-set architecture.

Some of the (vector, scalar, and control) registers are so-called configuration registers. The content of a configuration register can only be loaded from the vector memory; there is no other way to change its value. A configuration register supports the configuration of functional units, and typically defines a function parameter. By storing these "semi-constant" function parameters in configuration registers, both the instruction width and memory traffic are reduced considerably.

An overview of the components of the CVP state is presented in the table below.

| | control path | | scalar path | | vector path | | |
|---|---|---|---|---|---|---|---|
| FU | data | configuration | data | configuration | data | configuration | |
| vmu | offset 5 | address cu 8 | | | data memory | 2048 | |
| cgu | | | counter 3 | codes 3 | state | 6 masks | 2 |
| | | | | | | polynomials | 2 |
| amu | | | receive 1 | segment size 1 | register file | 16 | |
| sfu | | | | | register | 1 shuffle patterns | 4 |
| slu | | | receive 1 | | register file | 2 | |
| sru | | | receive 1 | | register file | 2 | |
| idu | pc | 1 loop cu 2 | | | program mem. | 2048 | |

All programmer-visible registers can be loaded from the vector memory. All registers, except the configuration registers can be saved into the vector memory. By saving the CVP registers at the end of a stint, and by restoring them at a later time, the CVP can continue a particular task as if no other stints were executed meanwhile. These save and restore operations are optional, may be partial, and must be programmed explicitly.

The Memory Unit and AGUs

Figure 4:
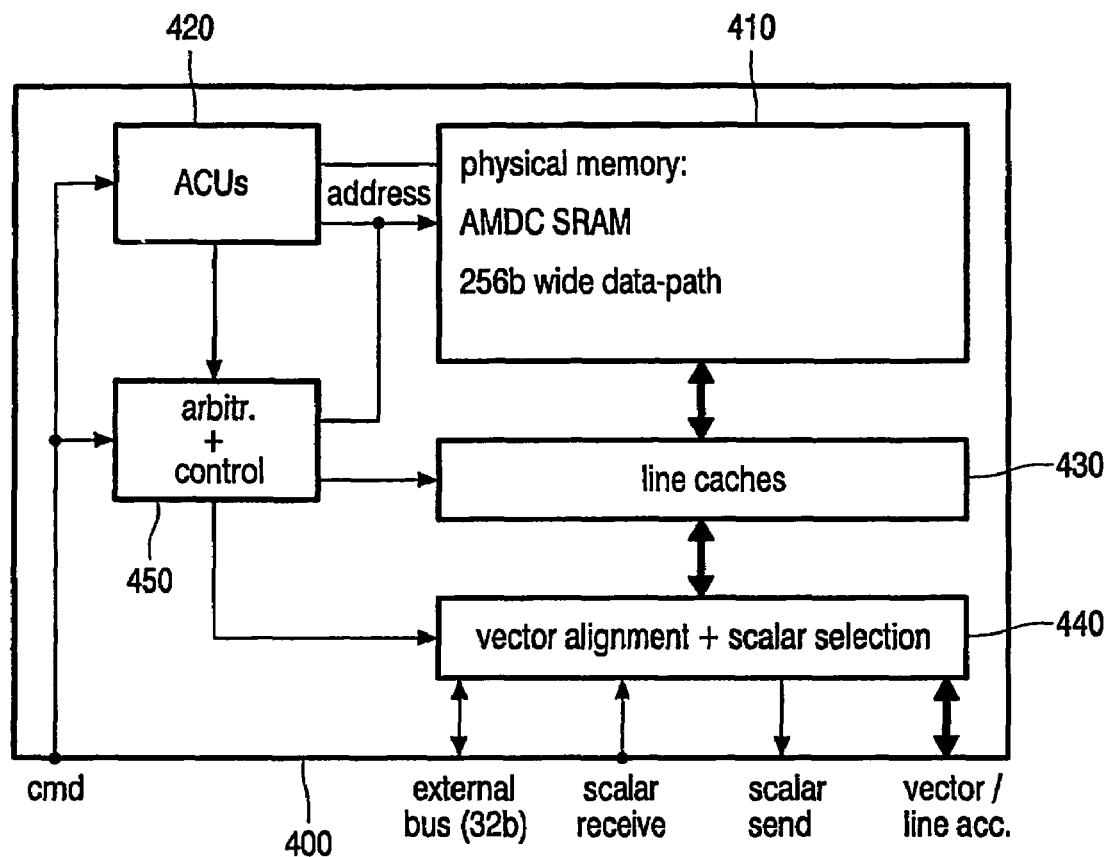
FIG. 4 shows a block diagram of the vector-memory unit.

FIG. 4 shows a block diagram of the memory unit (VMU 400). In the preferred embodiment described below, the memory unit is used in a vector processor in combination with a physical memory with a width capable of storing an entire vector. It will be appreciated that the same concept may also be applied to scalar processors, such as conventional DSPs. The VMU contains and controls the vector memory 410, which provides a huge data bandwidth to the other functional units. The physical vector memory 410 is preferably based on a single-ported SRAM. Since embedded SRAMs that are Ps*W wide are not generally available, the physical memory may be formed by one or more banks of wide Random Access Memories (RAM) arranged in parallel.

The VMU 400 includes at least one address-computation unit (ACU) 420 that support automatic address generation. Referring to the overall architecture of FIG. 2, the ACU is assumed to be located in the control section 230 of the VMU 260. It will be appreciated that the ACU need not be physically located in the VMU but may also be connected to it. Preferably, the ACU supports addressing modes (address generation algorithms) like those in conventional DSPs. The ACU performs one or more address calculations per instruction without using the processor's main data path. For example, the address of a scalar can be post-incremented after each scalar read access. This allows address calculation to take place in parallel with arithmetic operations on data, improving the performance of the processor. Depending on the set of addressing modes supported, such an ACU needs access to a number of registers. For example, relative addressing, i.e. addressing relative to a so-called base address, requires:

a base register base an offset with respect to the base address, stored in an offset register offs a pre/post increment of the offset by a value stored in an increment register incr modulo addressing with respect to an address stored in a bound register bound With this set of addressing modes, the following can be supported. Assume an offset register offs. After each memory access (read or write) at address base +offs, register offs is updated according to offs:=(offs+incr) modulo bound. Hence, offs changes frequently (after every access), whereas the values stored in base, incr, and bound change infrequently. Typically those three latter registers are initialized prior to a program loop. The initialization of the set of registers is also described as "configuration of the ACU". In order to avoid excessively long instructions and to avoid separate instructions on address calculations as much as possible, the control section of the VMU preferably includes a number of address computation units. Each address computation unit (ACU) can be associated with a set of (address) registers, and with an address calculation ("increment") operation(s). The association between the ACU and the set of registers may be fixed ("hardwired") or configurable, if so desired even at instruction level.

Assuming that the vector memory comprises $2^L$ lines, a scalar or vector address requires $L+{}^2\log 4P_Q$ bits. With, for example $P_Q=8$ and $L=12$, this means 17 bits. The registers of the ACU may have the same size as the address. If so desired, some of the register may be smaller. For example, increment may be limited to only relatively small steps, e.g. 8 bits. Preferably, all registers are equal size. A preferred embodiment is shown in the next table, where a set of ACU registers contains four address registers:

| Name | # bits | Explanation |
|---|---|---|
| Base | 24 unsigned | Address base register. |
| Offs | 24 unsigned | Address offset from base. |
| Incr | 24 signed | Increment value (−bound < incr < bound). |
| Bound | 24 unsigned | Upper bound. |

The preferred address range and type (signed/unsigned) is also indicated in the table. In this configuration, each ACU register is 24 bit. As will be described in more detail below, the ACU registers can stored to/loaded from the memory 410. To simplify modification of a register when it is stored in the memory, a register width is chosen that is aligned with the basic unit for accessing the memory, i.e. on 8-bit word boundaries. Therefore, 24 bit registers are used instead of 17 bit that would be sufficient for the exemplary memory size. It will be appreciated that for certain address calculations also less than three registers are sufficient. It is thus possible to dedicate one or more sets of registers to such calculations, providing a saving in registers.

Figure 5:
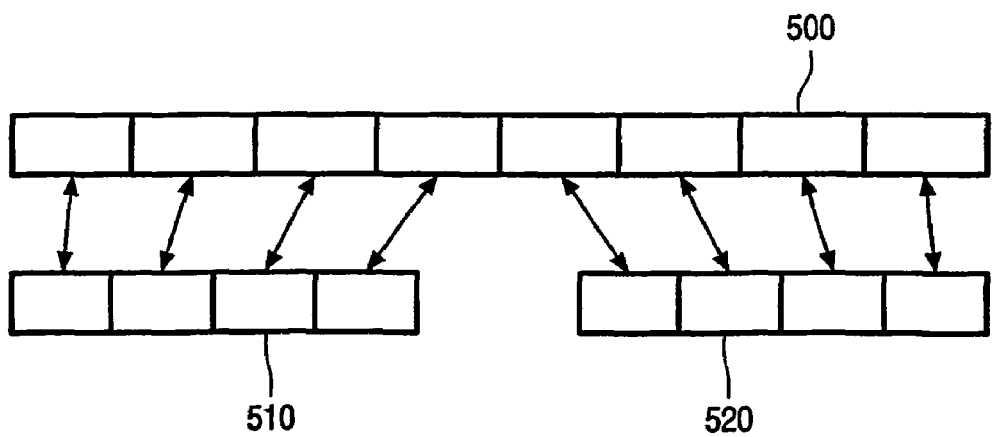
FIG. 5 illustrates mapping two sets of ACU registers to one vector register.

In the preferred embodiment, the VMU includes eight sets of ACU registers. This enables different address calculations for the vector section and scalar section of a functional unit. It also provides efficient support for multiple data rams in one algorithm where each data stream has its own pointers (and thus address calculations for calculating and updating of the pointer). Conventionally, configuration of an individual set of ACU registers took a few clock cycles per set. As such, the time required for configuration of ACU registers can become a bottle-neck. To overcome such a configuration delay, at least two registers pertaining to one set of ACU registers can be configured in a single operation. This can be realized by mapping all those ACU registers on a single memory word, such as a vector, and by using dedicated load and store instructions from the vector memory to the ACU memory. Preferably, the entire set of relevant registers of one set of ACU registers can be configured in a single operation of preferably one clock cycle. If the memory width allows, advantageously registers of more than one set of ACU registers can be configured in one operation. In the example, one set of four ACU registers requires 4*24=96 bits. As described earlier, preferably a vector is 256 bits wide. In such a case, the ACU configuration speed can be increased even further by mapping the registers of multiple sets to one memory line (vector). In the example, two sets of ACU registers can be mapped to one vector. This is also illustrated in FIG. 5. A vector is indicated by number 500 and the quad word boundaries are shown. Two sets of ACU registers 510 and 520 are also shown. In the example, the ACU registers are 24 bits and as such do not correspond to one of the standard data sizes of the vector. To be able to also easily access the individual ACU registers through the vector memory, the special instructions for loading/storing the ACU registers to the memory ensure that the individual ACU registers are aligned on word boundaries (in the example, the 24 bits register are aligned on quad-word boundaries). Persons skilled in the art will be able to define an optimal mapping depending on the ACU register size and the vector size. For example, using 16 bit ACU registers and a 256 bit vector makes it possible to map four sets of ACU registers to one vector. In the instructions the numbers of the sets of ACU registers to be stored/loaded need to be indicated. Separate or combined instructions may be used for loading a single ACU register set or a group of ACU register sets. The group of ACU register sets to be loaded/stored may be fixed. For example, if the sets are identified by a number 0 to 7, four fixed groups may be formed where the group number is the two most significant bits of the set. If so, desired groups may also be formed dynamically, for example by allowing more than one set to be specified in the load/store instruction.

Figure 6:
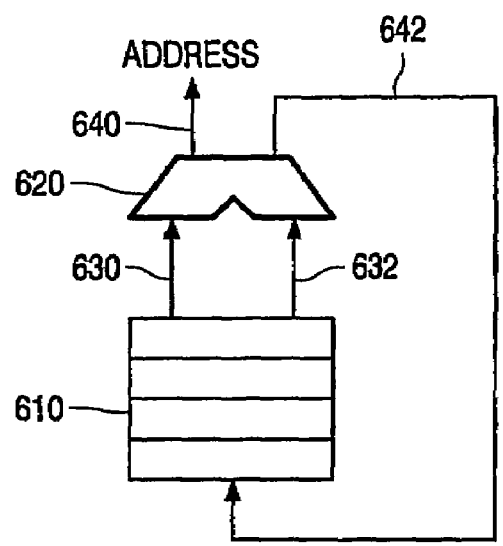
FIG. 6 shows a fixed relationship between a set of ACU registers and an ACU.
Figure 7:
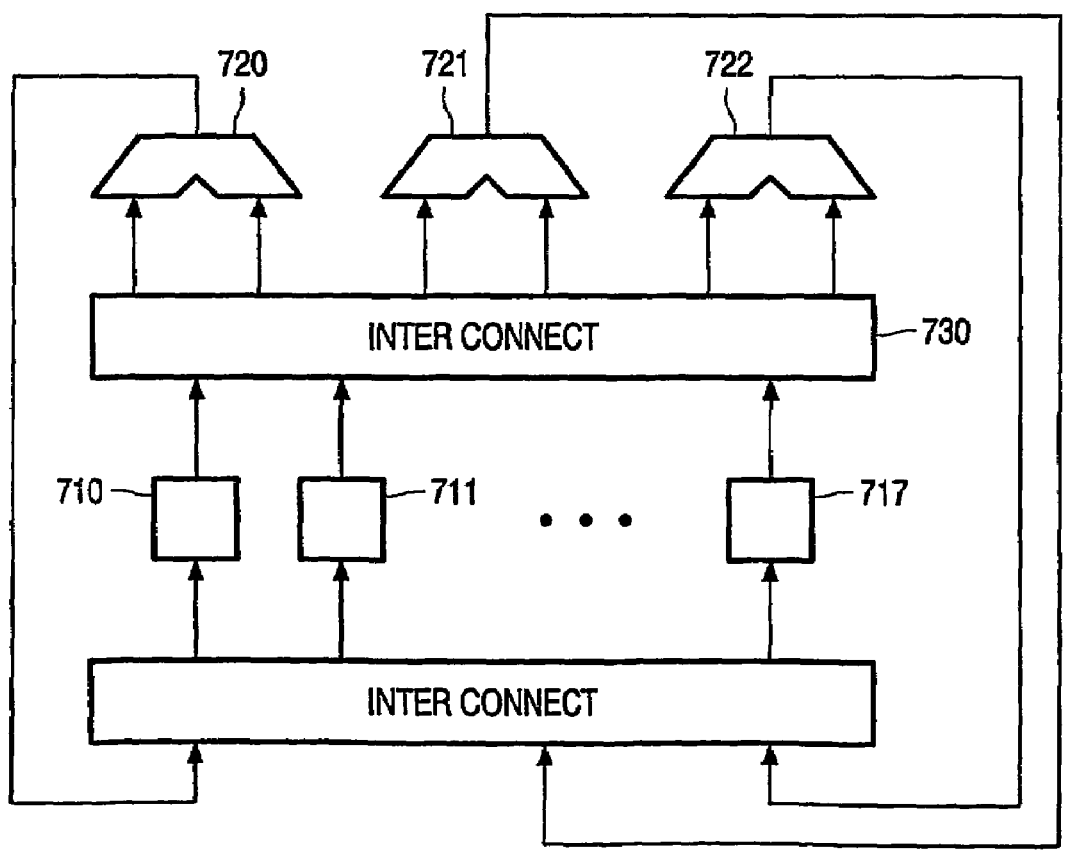
FIG. 7 shows a configurable relationship between the sets and the ACUs.

FIG. 6 shows a set 610 of four ACU registers that is fixedly connected to an ACU 620. Via paths 630 and 632 the registers' data is supplied to the ACU. The ACU supplies as output 640 the calculated address and at the output 642 the updated data for the registers. In the preferred embodiment with eight independent sets of ACU registers this may be duplicated eight times (not shown in the figure). FIG. 7 shows an alternative arrangement. In this arrangement eight sets of ACU registers are shown numbered 710 to 717. A different number of ACUs are used. In this example, three ACUs are used, numbered 720, 721 and 722. The ACUs can be dynamically connected to one of the sets of registers. If so desired a full interconnect 730 may be present to enable connecting each of the ACUs to any one of the sets of registers. Of course, the interconnect 730 need not be full (for example, an ACU can only be connected to three or four sets). The interconnect 740 ensures that the updated register values can be supplied back to the desired set. Interconnect 704 mirrors interconnect 730.

In the remainder a detailed description is given of the preferred VMU and ACUs. For this description it is assumed that each ACU is fixedly associated with one set of ACU registers. The VMU can be partitioned into a control, scalar and vector section. These sections will be modeled according to a Moore machine model, comprising five elements: inputs, outputs, state, next-state function, and output function. The state of the Moore machine is determined by the available memory and/or register(s). For each functional unit, a table is given that defines all allowed transitions, including the corresponding guards. A guard is the condition that needs to be true for the transition to occur. The transitions define the next-state functions and the output functions of the Moore machine. In the tables square brackets are used to select an element within a vector. For example: vp denotes element p of vector v.

The vector-memory unit can support up to four concurrent "sub-operations" in a single VMU instruction:

send a vector, or send a line, or receive a line from/to VM location (vector sub-operation);

send a scalar from a VM location (send scalar sub-operation);

receive a scalar to a VM location (receive scalar sub-operation);

modify the state/output of an address computation unit (ACU sub-operation.

Parameters for each of those four concurrent instructions are all given in the following VMU command (VMU_cmd), where the vector sub-operation is specified by vopc, aid_v, and ainc_v, the send scalar sub-operation is specified by sopc, aid_s, and ainc_s, size, the third receive scalar sub-operation is specified by srcv, aid_r, and ainc_r, and the ACU sub-operation is specified by aopc, aid_a, and imm_addr. Whereas the fourth operation directly controls one of the ACUs, the other three operations may as a side effect also control an ACU as will be described below in more detail.

VMU_cmd=(vopc, aid_v, ainc_v, sopc, aid_s ainc_s, size, srcv, aid_r, ainc_r, aopc, aid_a, imm_addr)

vopc=NOP|SENDL|SENDV|RCVL_CGU|RCVL_AMU|RCVL_SFU|RCVL_SLU|RCVL_SRU aid_v={0, . . . , 7} ainc_v=NOP|INC sopc=NOP|SEND aid_s={0, . . . , 7} ainc_s=NOP|INC size=WORD|DWORD|QWORD srcv=NONE|VMU|AMU|SLU|SRU aid_r={0, . . . , 7} ainc_r=NOP|INC aopc=NOP|IMM|LDBASE|LDOFFS|LDINCR|LDBOUND aid_a={0, . . . , 7} imm_addr={0.0, . . . , 524288.31}|{−262144.0, . . . , 262143.31}

The VMU instruction may take a variable number of clock cycles, depending on the number of sub-operations and the continuity of address sequences.

The VMU Inputs/Outputs Are:

| | Explanation |
|---|---|
| Input | |
| Cmd | VMU command |
| rcv_amu | AMU vector receive bus |
| rcv_cgu | CGU vector receive bus |
| rcv_sfu | SFU vector receive bus |
| rcv_slu | SLU vector receive bus |
| rcv_sru | SRU vector receive bus |

-continued

| | Explanation |
|---|---|
| s_rcv_amu | AMU scalar receive bus |
| s_rcv_slu | SLU scalar receive bus |
| s_rcv_sru | SRU scalar receive bus |
| Output | |
| Snd | VMU vector result |
| s_snd | VMU scalar result |

In addition there are two scalar ports (one send, one receive) to be connected to the external bus. Synchronization of these memory accesses with CVP instructions is the task of the micro-controller 130.

The VMU Vector Section Contains the Physical Vector Memory 410:

| Name | Explanation |
|---|---|
| mem[4096][32] | Vector memory: 4096 lines of 32 words each |

Vector Sub-Operations

Note that vector sub-operations cannot access the scalar memory. Hence, the most significant address bit is ignored for vector sub-operations. The vector section of the VMU supports seven sub-operations, encoded in the VOPC field of the instruction: vector send (SENDV), line send (SENDL), and five line receive sub-operations (RCVL_CGU, RCVL_AMU, RCVL_SFU, RCVL_SLU, and RCVL_SRU). The seven sub-operations can not be executed simultaneously. Only one sub-operation can be specified at a time. The functional unit that is the source of the receive is explicitly encoded in the corresponding line receive sub-operation. The read address or write address for each sub-operation is specified by a corresponding address computation unit. The AINC_V field is shared between all vector sub-operations. It will be passed on to the ACU encoded in the AID_V field. In this way the specified ACU is controlled as a side-effect of a vector sub-operation. The AINC_V field specifies whether the affected address computation unit should perform a post-increment operation.

| Guard | Transition |
|---|---|
| vopc = NOP | None |
| vopc = SENDL | snd = mem.line[acu[aid_v].out] |
| vopc = SENDV | snd = mem.vector[acu[aid_v].out] |
| vopc = RCVL_CGU | mem.line[acu[aid_v].out] = rcv_cgu |
| vopc = RCVL_AMU | mem.line[acu[aid_v].out] = rcv_amu |
| vopc = RCVL_SFU | mem.line[acu[aid_v].out] = rcv_sfu |
| vopc = RCVL_SLU | mem.line[acu[aid_v].out] = rcv_slu |
| vopc = RCVL_SRU | mem.line[acu[aid_v].out] = rcv_sru |

Note that the operations are cast as send (or receive) actions, and not as load (or store) actions involving a destination (or source). The latter are specified by operations in other functional units. A line send is functionally equivalent to a vector send with the same address. Line-send sub-operations are typically used to configure functional units, or to restore the state of a task in the various registers. By introducing a special mode for line send, the access times of successive vector sends ("vector streaming") can be optimized through efficient usage of caches.

The scalar send sub-operation of the VMU is encoded in the SOPC field of the instruction. It supports only one sub-operation: scalar send (SEND). The read address is specified by the address computation unit specified in the AID_S field. The AINC_S field of the instruction specifies whether this address computation unit should perform a post-increment operation. In this way a second ACU can be controlled indirectly (the first one being controlled via the vector sub-operation). The operand size (WORD, DWORD or QWORD) of the scalar sub-operation is determined by the SIZE field of the instruction.

| Guard | Transition |
|---|---|
| sopc = NOP | None |
| sopc = SEND && size = WORD | S_snd = mem.word[acu[aid_s].out] |
| sopc = SEND && size = DWORD | S_snd = mem.dword[acu[aid_s].out] |
| sopc = SEND && size = QWORD | S_snd = mem.qword[acu[aid_s].out] |

The scalar receive sub-operation of the VMU is encoded in the SRCV field of the instruction. If its value is NONE, no scalar receive is performed. Otherwise, the SRCV field of the instruction determines which functional unit will be used as source for the scalar receive. The write address is specified by the address computation unit specified in the AID_R field. In this way a third ACU can be controlled indirectly. The AINC_R field of the instruction specifies whether this address computation unit should perform a post-increment operation. The operand size (WORD, DWORD or QWORD) of the scalar receive sub-operation is determined by the size of the source scalar.

| Guard | Transition |
|---|---|
| Srcv = NONE | None |
| Srcv = VMU | Mem.scalar[acu[aid_r].out] = s_rcv_vmu |
| Srcv = AMU | Mem.scalar[acu[aid_r].out] = s_rcv_amu |
| Srcv = SLU | Mem.scalar[acu[aid_r].out] = s_rcv_slu |
| Srcv = SRU | Mem.scalar[acu[aid_r].out] = s_rcv_sru |

The send and receive sub-operation can be combined into a scalar move operation, from one VM location to another. The address for each access is specified by a corresponding address computation unit.

As described above, in this way each of the ACUs can be assigned flexibly to any of the VMU sub-operations of vector, scalar send and scalar receive. In this way, three ACUs can be operated in each instruction. To avoid conflicts, a restriction is that each ACU may only be used for one of those VMU sub-operations, i.e. AID_V≠AID_S≠AID_R. Persons skilled in the art will be able to adjust the instruction and underlying hardware to support more than three ACU's if so desired or to support other configuration between the ACU and the set of ACU registers. For example, if a set of registers is not fixedly assigned to an ACU, then the instruction may also carry an identification of the set to be used.

The ACU sub-operation is provided by the VMU control section and encoded in the AOPC field of the VMU instruction. It supports one sub-operation to set the output of an ACU to an immediate address value (IMM), and four sub-operations to load an immediate address into one of the ACU-registers (LDBASE, LDOFFS, LDINCR, and LDBOUND). The purpose of the immediate addressing is to bypass the regular addressing and 'quickly' retrieve an address directly from the instruction. This is particularly useful for loading of a single word. The corresponding immediate address is encoded in the IMM_ADDR field. The AID_A field specifies which ACU is to be affected by the AOPC sub-operation; the AOPC field and IMM_ADDR field from the VMU instruction will be passed on directly to this particular ACU, and the AOPC field of all other ACUs will be set to no operation (NOP).

An address computation unit (ACU) can support two "sub-operations" during a single ACU operation:
A post-increment sub-operation;
An immediate address manipulation sub-operation.
ACU_cmd=(ainc, aopc, imm_addr)
ainc=NOP|INC
aopc=NOP|IMM|LDBASE|LDOFFS|LDINCR|LDBOUND
imm_addr={0.0, . . . , 524288.31}|{−262144.0, . . . , 262143.31}

The post-increment sub-operation is encoded in the AINC field of the instruction. It supports only one sub-operation: post-increment (INC). This sub-operation is used to avoid excessive explicit address calculation instructions.

| Guard | Transition |
|---|---|
| ainc = NOP | None |
| ainc = INC | offs = (offs + incr) mod bound |

The immediate address manipulation sub-operation is encoded in the AOPC field of the instruction. It supports one sub-operation to output an immediate address (IMM), and four sub-operations to load an immediate address into one of the ACU-registers (LDBASE, LDOFFS, LDINCR, and LDBOUND). The immediate address is encoded in the IMM_ADDR field of the instruction.

| Guard | Transition |
|---|---|
| aopc = NOP | out = base + offs |
| aopc = IMM | out = imm_addr |
| aopc = LDBASE | out = base + offs; base = imm_addr |
| aopc = LDOFFS | out = base + offs; offs = imm_addr |
| aopc = LDINCR | out = base + offs; incr = imm_addr |
| aopc = LDBOUND | out = base + offs; bound = imm_addr |

The ACU Inputs/Outputs Are:

| | Explanation |
|---|---|
| Input | |
| Cmd | ACU command (see instruction format for details) |
| Output | |
| Out | ACU address (line address + scalar within line) |

In the preferred embodiment, a vector needs not to be aligned at vector boundaries in the memory. As such, a vector consisting of $P_S$ words may have an arbitrary memory address. A memory line has the same size, but its start address is by definition a multiple of $P_S$. (For line accesses, the least significant $^2\log P_S$ bits of the address are ignored.) By allowing arbitrary alignment of vectors (typically alignment on the smallest word boundary), the memory can be utilized better, with less empty locations. Measures may be taken for allowing the scalar/vector processor to read/write individual vectors whereas the vector may be stored in two consecutive lines of the physical memory. Preferably, the scalar data is stored in the same memory as used for storing the vector data In such a system, scalars can be intermixed with vectors to which they correspond. For cost-effectiveness and optimum access time to the memory, the memory preferably only allows reading and writing of full vector lines. As such, logically the physical memory consists of lines, each of the size of a vector. To support reading and writing of scalars additional hardware (line caches 430 and support 440 for scalar selection within a line) is used to access the vector-wide physical memory in a scalar fashion.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The words "comprising" and "including" do not exclude the presence of other elements or steps than those listed in a claim.

The invention claimed is:

1. A processor including:
a memory port for accessing a physical memory under control of an address;
at least one processing unit for executing instructions stored in the memory and/or operating on data stored in the memory;
at least one address generation unit (hereinafter "AGU") for generating an address for controlling access to the memory;
the AGU being associated with at least a first set of a plurality of N registers that are used for address generation, where the set of registers enables the AGU to generate the address under control of an address generation mechanism; and
a memory unit operative to save/load k of the N registers that are used for address generation, where 2<=k<=N, triggered by one operation, where the memory unit includes a concatenator for concatenating the k registers to one memory word to be written to the memory through the memory port and a splitter for separating a word read from the memory through the memory port into the k registers.

2. A processor as claimed in claim 1, wherein the memory unit is operative to perform the saving/loading in one write/read cycle of the memory.

3. A processor as claimed in claim 1, wherein k=N.

4. A processor as claimed in claim 1,
wherein the processor includes at least one further set of a plurality of registers enabling an AGU to generate an address under control of an address generation mechanism; and
the concatenator being operative to concatenate also at least one further register of at least one of the further sets of register to the one memory word to be written to the memory through the memory port and the splitter being operative to separate a word read from the memory through the memory port into the respective k registers of the first set of registers and at least one further register of the at least one further sets of registers.

5. A processor as claimed in claim 4,
wherein the processor includes at least two AGUs, each for generating an address for controlling access to the memory;
each of the AGUs being associated with a respective one of the sets of a plurality of registers.

6. A processor as claimed in claim 4, wherein the AGU is selectably connectable to at least two sets of registers, where each set of registers enables the AGU to generate a respective address under control of an address generation mechanism.

7. A processor as claimed in claim 3, wherein the concatenator is operative to concatenate of at least two sets of registers all respective associated registers to the one memory word to be written to the memory through the memory port and the splitter being operative to separate a word read from the memory through the memory port into all the respective associated registers of at least two of the sets of registers.

8. A processor as claimed in claim 4 wherein the processor enables selection of individual sets of registers whose respective registers need to be saved or stored in one operation; and the memory unit being operative to perform the concatenation/separation to/from one memory word for the selected sets of registers.

9. A processor as claimed in claim 1, wherein the processor is operative to operate on operands with a smallest size of one processor word and the memory word has a width of a multiple of the processor word size; and the concatenator is operative to map the registers to boundaries in the memory that correspond to the processor word to enable direct modification of a register by the processor.

10. A processor as claimed in claim 1, wherein the processor is operative to process a plurality of M data elements in parallel, and the physical memory has a width for storing the M data elements.

* * * * *